(12) United States Patent
Jugl

(10) Patent No.: US 8,189,731 B2
(45) Date of Patent: May 29, 2012

(54) MACHINERY SYSTEM ALLOWING REPLACEMENT OF OLD REACTOR WITH A NEW REACTOR IN NUCLEAR POWER ELECTRIC GENERATING STATION

(76) Inventor: John Jugl, Bayville, NY (US)

( * ) Notice: Subject to any disclaimer, the term of this patent is extended or adjusted under 35 U.S.C. 154(b) by 661 days.

(21) Appl. No.: 12/459,677

(22) Filed: Jul. 7, 2009

(65) Prior Publication Data

US 2011/0007861 A1    Jan. 13, 2011

(51) Int. Cl.
    *G21C 19/00* (2006.01)
(52) U.S. Cl. .......... 376/260; 376/262; 376/263; 404/83; 299/29
(58) Field of Classification Search .................. 376/260, 376/262, 263
See application file for complete search history.

(56) References Cited

U.S. PATENT DOCUMENTS

| | | | | |
|---|---|---|---|---|
| 4,297,061 A | * | 10/1981 | Wolfe et al. ................... | 409/131 |
| 4,924,951 A | * | 5/1990 | Paulson .......................... | 175/57 |
| 6,252,922 B1 | * | 6/2001 | Hasegawa et al. ............ | 376/260 |
| 6,536,987 B2 | * | 3/2003 | Chang .............................. | 404/25 |
| 6,625,245 B1 | * | 9/2003 | Aoki et al. ..................... | 376/260 |
| 7,740,415 B1 | * | 6/2010 | Crites ............................. | 404/94 |

* cited by examiner

*Primary Examiner* — Ricardo Palabrica

(57) ABSTRACT

The machinery system and its application herewith, intended to create an opening in the roof of a Reactor Primary Containment of Generation II and III Nuclear Power Electric Generating Station. This opening is necessary to replace an aging nuclear reactor with a new, safer and more efficient reactor. Generation II and III Nuclear Power Electric Generating Stations include General Electric (GE) Boiling Water Reactor BWR/2, 3, 4, 5 and BWR/6 located in Mark II, and Mark III wet containments and Pressurized Water Reactors manufactured by Westinghouse, Combustion Engineering and Babcock and Wilcox located in dry containments. Until this time, existing reactor replacement was not possible due to Reactor Primary Containment structural enclosure configuration. The Dual Head Vertical Milling Machine System will remove a Reactor Primary Containment Dome Segment thus providing an opening, allowing reactor replacement and the electric generating station to remain operational for an other 40 years and beyond. Original containment integrity will be reinstated by closure of the opening.

3 Claims, 9 Drawing Sheets

SECT. A-A

SECT. B-B

MACHINERY SYSTEM ALLOWING REPLACEMENT OF OLD REACTOR WITH A NEW REACTOR IN NUCLEAR POWER ELECTRIC GENERATING STATION

BACKGROUND OF THE INVENTION

In a Nuclear Power Electric Generating Station most equipment no matter how small or large can be replaced with the exception of the Reactor. This is due to the Reactor Primary Containment inherent design configuration. The original design base was that after 40 years of useful operation, decommission the unit by entombing the Reactor in place in the Reactor Primary Containment. But, with today's world wide shortage of clean, renewable, affordable energy this approach is no longer practical or acceptable. The entire Generation II and III Reactors are rapidly reaching or exceeding their 40 years design life cycle. Some other phenomena such as the Inter Granular Stress Corrosion Cracking (IGSCC) may further reduce this life span. Scientific studies conducted by credible institutions such as the School of Materials, University of Manchester, U.K. and the Department of Chemical Engineering and Applied Chemistry, University of Toronto, Canada and many others, concluded that (IGSCC) is a life limiting factor in nuclear plant components and potential structural failure present substantial hazard to both safety and economics. As a result of the above, the operating electric utilities are facing two possible options:

Option 1. Decommission the unit.
  Incurred expenses can financially hurt the utility and its rate payers.
Option 2. Try to obtain an extended operating license from the Nuclear Regulatory Commission (NRC) and to stay on line beyond the 40 years design life.

An extended operation beyond the 40 years design life may result in the following hidden risk: Reactor vessel nozzle exposed to prolonged radiation, thermal cycling and loading will develop hairline cracking. (IGSCC) It can not be readily detected, or repaired. A reactor vessel main steam or feed water nozzle failure will result in one of the most serious accident called a Loss of Coolant Accident. (LOCA)

This invention allows the removal and replacement of aging nuclear reactor with a new, safe, efficient, state of the art reactor.

SUMMARY OF THE INVENTION

At the present time, operating or decommissioned Nuclear Power Electric Generating Stations are unable to remove or replace their aging nuclear reactors. This is an unsafe and expensive situation for the electric utility and the rate payers. The Dual Head Vertical Milling Machine System invention herewith will provide a large enough opening in the steel reinforced concrete of the Reactor Primary Containment Dome allowing reactor replacement. The inside steel lining will be cut by conventional plasma, flame cutter and lifted out as a unit with the dome segment.

DETAILED DESCRIPTION OF THE INVENTION

Description of the Dual Head Vertical Milling Machine (DHVMM), Application and Operating Procedure.
Overview and Location of Machine.

Figure 1:
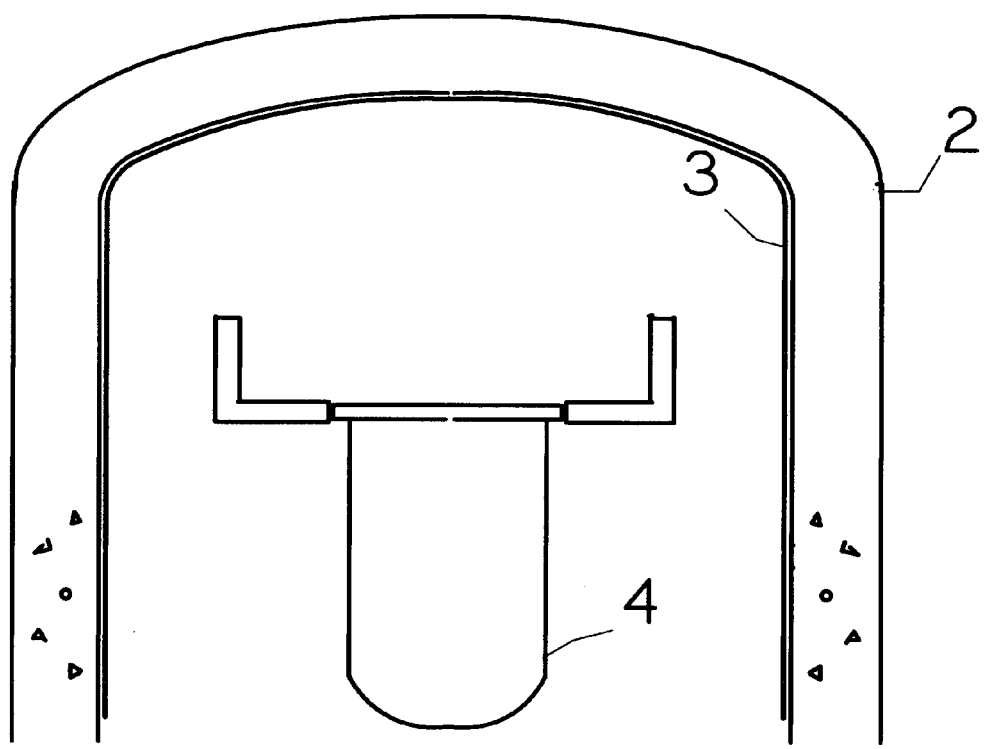
FIG. 1 is a section of Reactor Primary Containment (RPC) 2, steel lining 3, Reactor Pressure Vessel (RPV) 4 after work procedure in paragraph 7.0.
Figure 2:
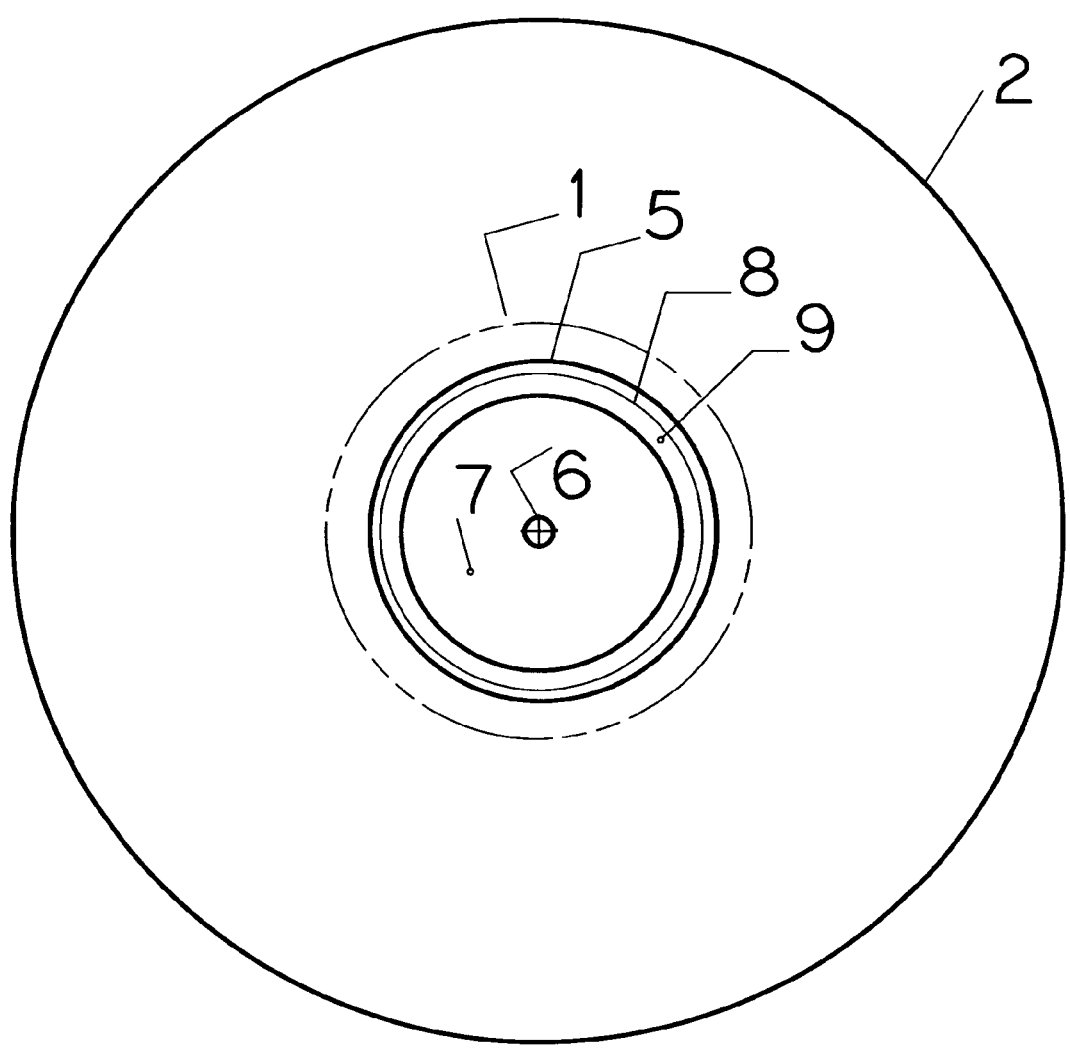
FIG. 2 is a plain view of 2, perimeter of the Dual Head Vertical Milling Machine (DHVMM) 1, the containment opening diameter 5, the steel lining opening diameter 8, the milled out containment dome segment 7 with the steel lining 9, and the lifting hole 6.
Figure 3:
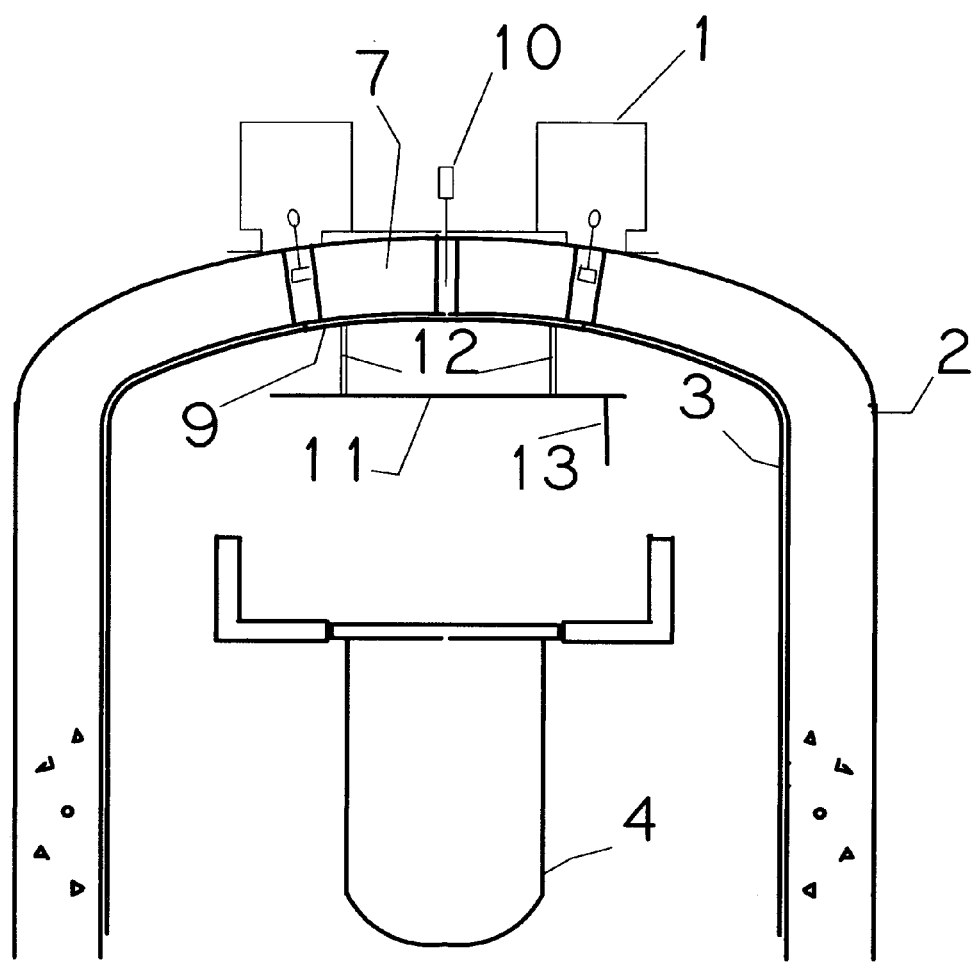
FIG. 3 is a sectional view of 2, with a composite view of 1, including temporary load bearing platform 11 and supporting column 13. Milled out segment 7, steel lining segment 9, supporting columns 12 and Drill Press 10.

The work location of ((DHVMM) is on top of the Reactor Primary Containment (RPC) structure. Temporary scaffolding, working platform and elevator are built outside of the (RPC) to set up the work station. Interfering architectural sidings or steel if any, are removed. The (DHVMM) assembled and lifted from the ground level to the top of the (RPC) and secured with six anchor bolts. A standard industrial vacuum dust and debris collector machine is located on ground level. Two flexible suction hoses are connected to the work station near the cutting heads for dust and debris removal. FIG. 1 is a sectional view of the de-fueled, dismantled and decontaminated Reactor Pressure Vessel (RPV) 4, (RPC) 2 and the containment steel lining 3, prior to milling operation. FIG. 2 is a plain view, FIG. 3 is a sectional view after the milling operation is completed and the (RPC) segment 7, the steal lining 9 and the (RPV) 4 are ready for removal.

Machine Construction Specification.

Figure 4:
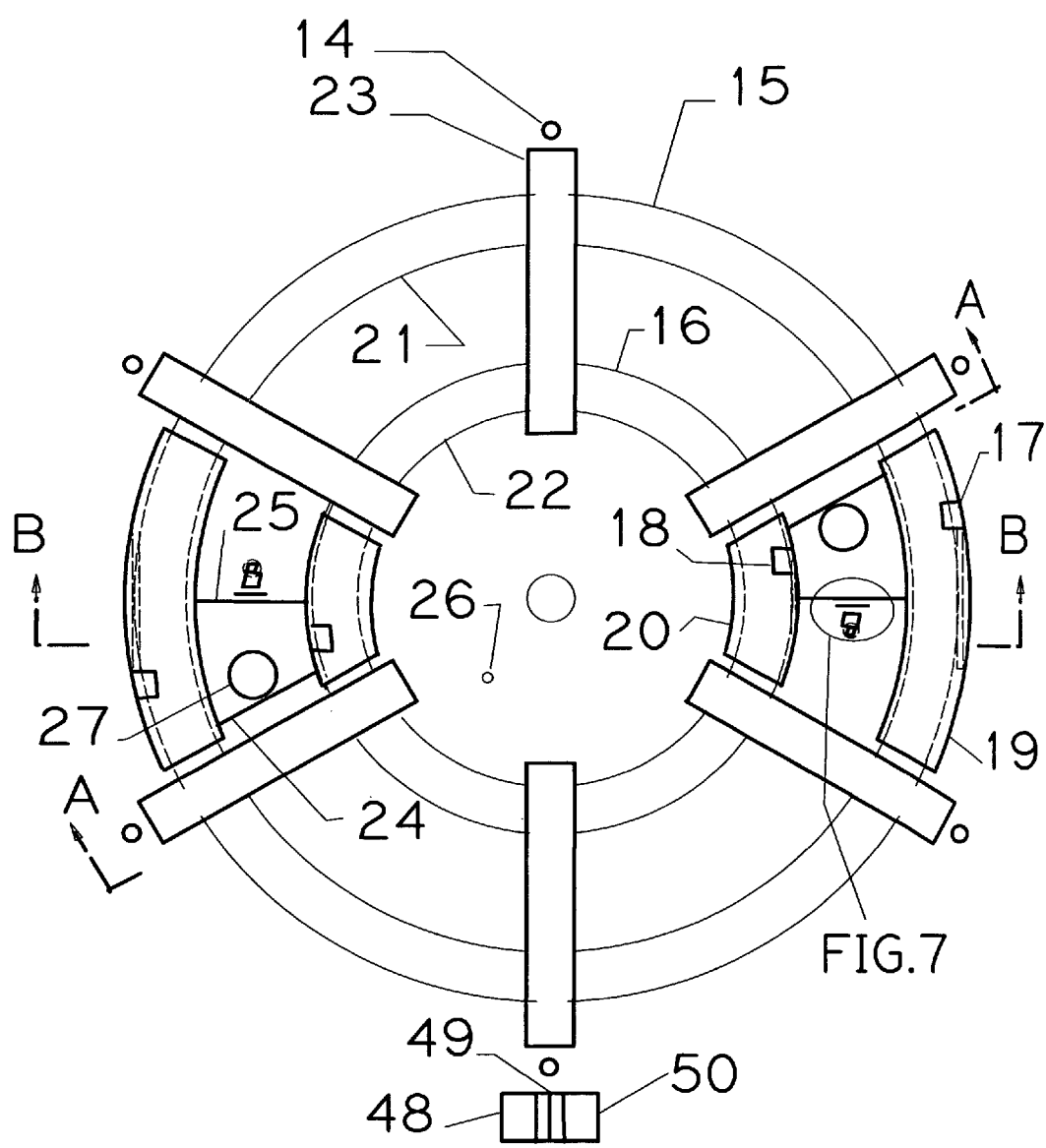
FIG. 4 is a plan view of the milling machine 1 and its components. Items 23 are the cross over structural support and 24, 25, 26 are structural supports. Items 15 and 16 are the outer and inner drive gears, 17 and 18 are the worm drives for tables 19 and 20. Items 21 and 22 are the outer and inner circular dove tailed table base, 27 are the hydraulic fluid reservoir. Item 48 is the control panel, 49 are the cable tensioning reels, and 50 is the circuit breaker panel.
Figure 5:
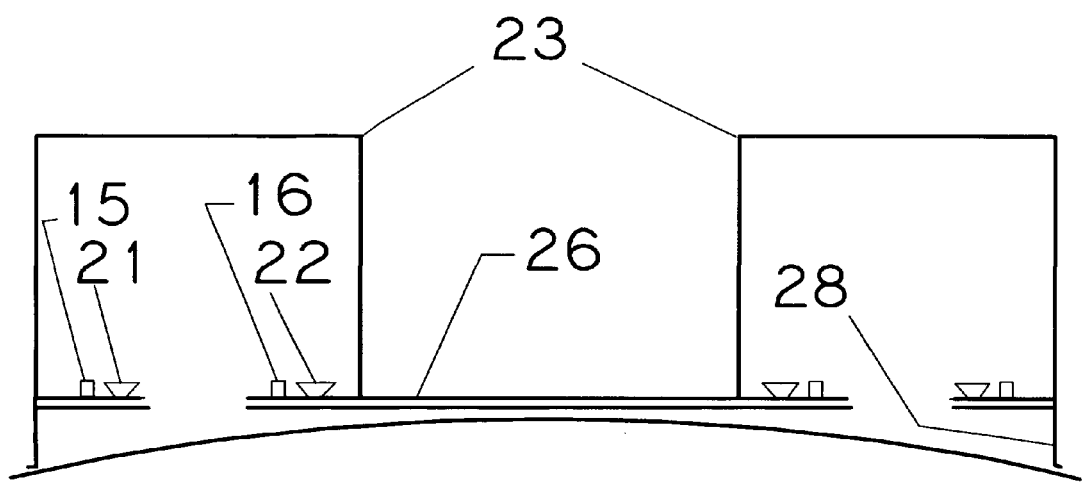
FIG. 5 is Section A-A. Items 23 are the cross over structure, 26 is the supporting steel, 28 are adjustable length supporting legs. Item 15 is the outer drive gear, 16 is the inner drive gear, 21 is the outer dove tailed table base, 22 is the inner dove tailed table base.
Figure 6:
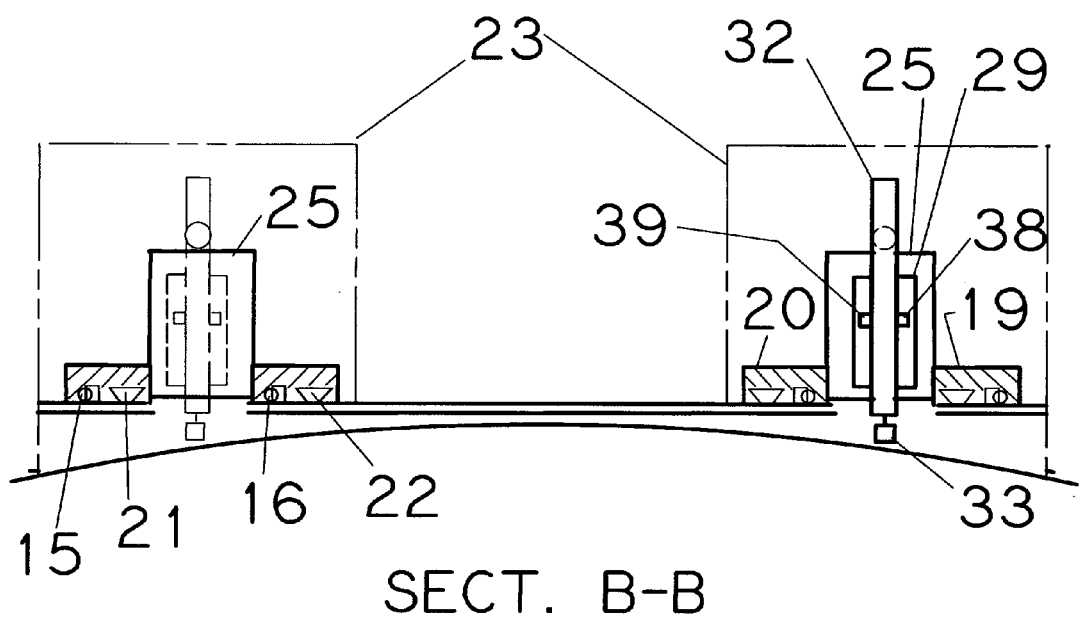
FIG. 6 is Section B-B. Item 23 is the cross over structure, 25 are the vertical support plates and the tie together of table 19 and 20. 15 and 16 are the outer and inner drive gear shown with worm drive. 21 and 22 are the outer and inner dove tailed table base. 29 is the adjustable support plate for vertical table 32 and cutter head 33. 38 and 39 are hydraulic positioning and locking pistons.
Figure 7:
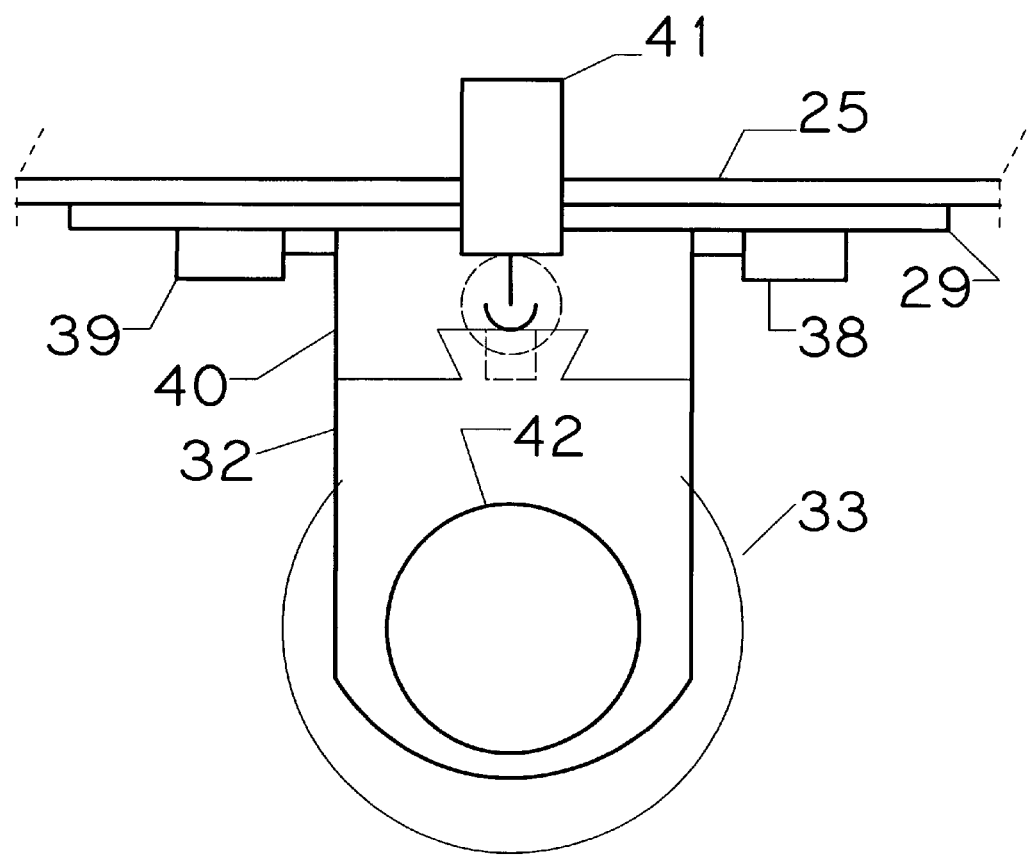
FIG. 7 is an enlarged view of the fixed vertical table support 25, adjustable table support 29, vertical table drive 41 and table base 40. Vertical traveling bed is 32 with cutter head drive motor 42 and cutter head 33. Transverse positioning hydraulic pistons are 38 and 39.
Figure 8:
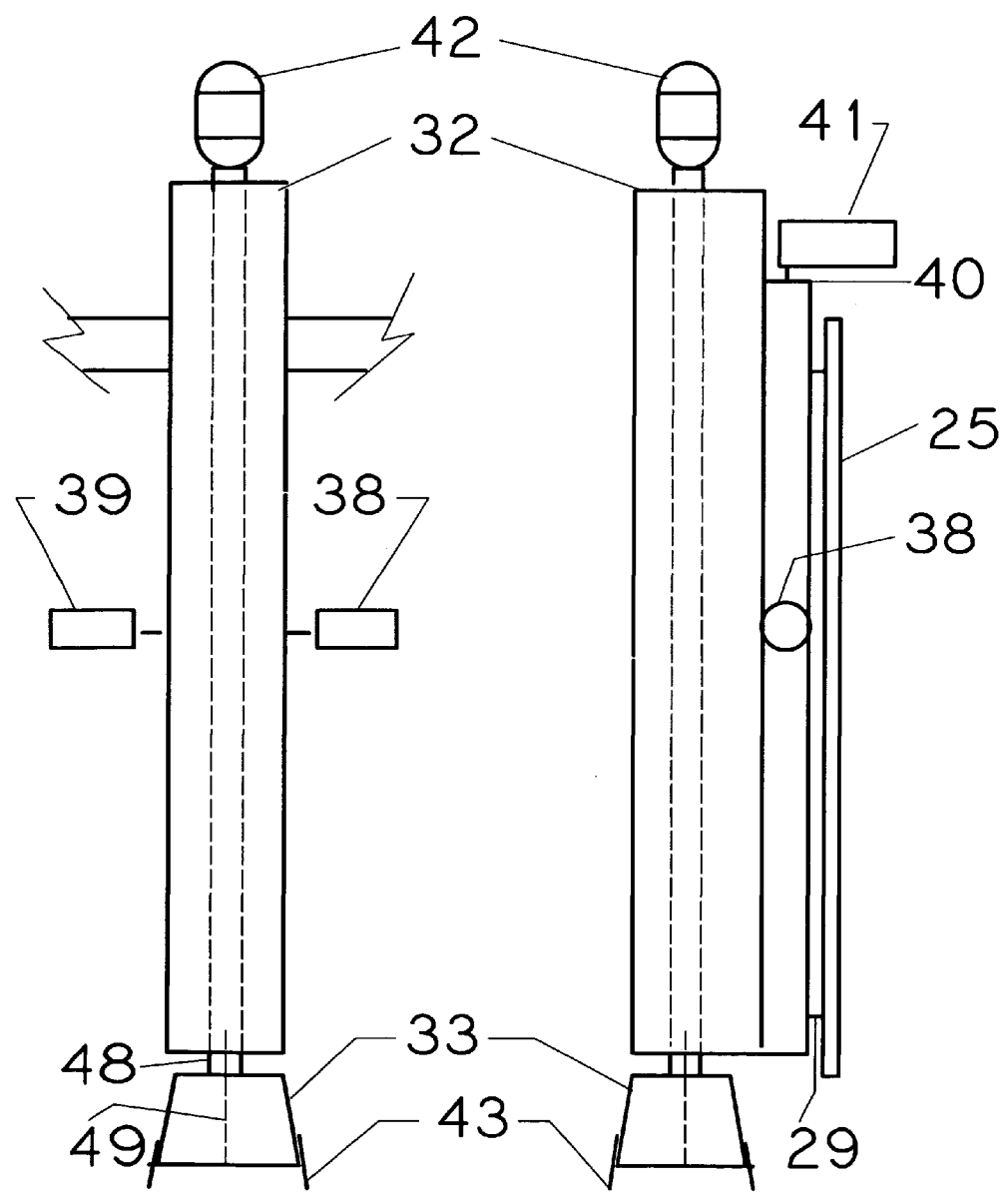
FIG. 8 is a front and a side view of the vertical table. Item 25 is the fixed plate support, 29 is the adjustable plate support, 40 is the table base, 32 is the vertical traveling bed with cutter head drive motor 42. 41 is the vertical table drive, 33 are the cutter heads and 43 are the cemented (brazed) carbide tip holding tool shanks. 48 is a tapered spindle and 49 is the securing/releasing bolt. Transverse positioning hydraulic pistons are 38 and 39.

The (DHVMM) FIG. 4 plan view, is circular in shape face milling type and is prefabricated in six (or more) segments to facilitate manufacturing and shipping. In the forward feed mode the horizontal table movement is clockwise. In reverse feed mode the table movement is counterclockwise. At the center a drill press FIG. 3 Item 10 equipped with a 3 inches core drill, to drill thru the (RPC) structure at the exact extended center above of the Reactor Pressure Vessel (RPV). The (RPC) steel lining hole is plasma (flame) cut from inside the (RPC). FIG. 2 Item 6. This hole is used for a lifting lug installation to remove the milled out dome segment. At the machine perimeter a programmable microprocessor based control panel, an electrical power supply breaker box and 2 cable tensioning reels are located. FIG. 4 Items 48, 50 and 49. There are two variable RPM clockwise rotating cutting heads symmetrically located 180 degree apart FIG. 6 and FIG. 7 Item 33. Each cutting head is 6 inches in diameter equipped with eight cutter tool holding shanks. Each tool shank holds an abrasion and shock impact resistant, cemented (brazed) carbide tip FIG. 8 Item 43. The cutter head and its drive motor 42 are mounted on a vertical table with dove tailed bed assembly 32 and 40. The vertical table FIG. 7 Item 40 is mounted on an on plate 29. Plate 29 is bolted to plate 25 which are secured to the horizontal table assembly 19 and 20 in FIG. 4 and FIG. 6. The cutter heads have 3 axis directional movements, at various travel range and speed capability. The face milling plan is parallel with the (RPC) contour tangent as much as possible.

Longitudinal table movement is in a level plain, circular pattern. It can travel around 360 degree; however, the movement is limited to 190 degree by programming. Forward and return feed speed can vary widely. In the forward feed mode a quarter of an inch deep 7 inches wide path is cut. In the reverse feed mode an additional 1 inch width is cut. Tables 19 and 20 in FIG. 4 are moved by an outer and an inner worm gear transmission assembly. FIG. 4, Item 17 and 18. The worms are driven by variable speed reversible motor and reducing gear box calibrated to have the same angular velocity and torque. A manual feed wheel is also provided.

Vertical table maximum travel range is 36 inches. The setting determine the tool insertion depth. Tool insertion angle can vary from 5 to 20 degree, initially manually set in 5 degrees increment as determined by the (RPC) contour. Support plate 25 is pre-drilled to the desired angle position and plate 29 is bolted to 25. Cutting depth above the maximum vertical table travel range, if needed, is accommodated by longer cutter head holding spindle 48 in FIG. 8. Vertical table 32 is positioned by standard screw type feed connected to a reducing gear box driven by a variable speed reversible motor 41, FIG. 7. The tool insertion depth and the rate of insertion are determined by programming. A manual feed wheel is also provided.

Figure 9:
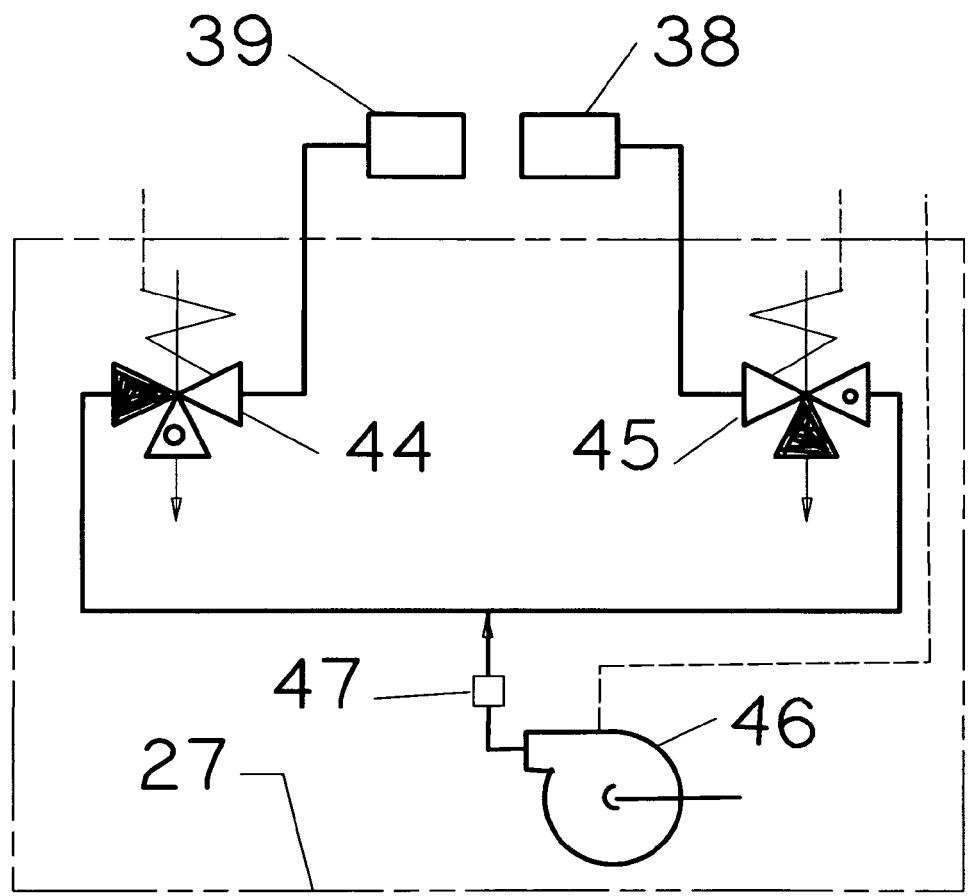
FIG. 9 is a schematic of the vertical table lateral positioning pistons 38 and 39. Item 27 is the hydraulic fluid reservoir, 44 and 45 are 3-way solenoid valves, 46 is a hydraulic pump and 47 is an adjustable flow control orifice.

Initial transverse setting is manually set, in function of the (RPC) opening diameter requirement. Support plate 25 is pre-drilled to the desired opening diameter setting position and plate 29 is bolted to 25. (RPC) opening diameter can be set at 19 feet 4 inches, 20 feet 4 inches, 21 feet 4 inches and 22 feet 4 inches. These dimension may be modified to meet actual field condition. The cutter head assembly 40 can laterally slide 1 inch on plate 29, powered by hydraulic pistons 38 and 39 in FIG. 7. These pistons positions are controlled by normally de-energized 3-way solenoid valves 44, 45 as shown in FIG. 9. 45 is shown in energized position. Lateral movement feed speed is regulated with a manually set orifice 47 in the fluid line and pump 46 located in the hydraulic fluid reservoir 27 in FIG. 9.

Preoperational Procedure.

Select 0 degree starting point near the control panel for cutter No. 1. With manual hand wheel move the horizontal table to this starting point.

With manual hand wheel move cutter No. 2 table to 180 degree position.

With manual hand wheel move both cutters vertically within $\frac{1}{8}^{th}$ of an inch above the (RPC) concrete structure.

Operating Programming Procedure.

Optimum settings is in accordance with manufacturers recommendation. The settings provided herewith is a workable example and can be modified based on experience.

At the control panel 48 FIG. 4 turn Power On/Off switch to On position.

Enter operating program settings as follows:
No. 1 or No. 2 or Both Cutters. Enter Both Cutters.
Cutter Head RPM=600 RPM
Forward Horizontal Feed Speed=1 inch/second
Tool Insertion Depth=0.25 inch (Cutting Depth)
Rate of Tool Insertion=0.25 inch/10 inches forward travel
Cutter Transverse Position=Outer wall. (Hydraulic fluid pump 46 switch ON, Piston 39 activated, solenoid valve 44 energized, solenoid 45 de-energized, FIG. 6, FIG. 7, FIG. 8 and FIG. 9) Cutter Transverse Positioning to Inner Wall for Reversal is at =33 feet horizontal travel. Assuming the (RPC) cut out diameter is set at 20 feet 4 inches. The cutter move is 1 inch toward the inner wall at the 33 feet point of reversal. (Piston 38 activated, solenoid valve 44 de-energized, solenoid 45 energized). This 1 inch cut is necessary to avoid tool chatter and vibration.
Return Cutter Head RPM=400 RPM
Return Horizontal Feed Speed=3 inches/second
Return Tool Insertion Depth=0 inch (actually it is cutting 0.25 inches deep×1 inch wide return path)
Program Status=Enter Save
Turn the Start/Stop switch to Start position. (This is the Start signal to start the milling operation)
The cycle will repeat at 0 start point for Cutter No. 1 and at 180 degree start point for Cutter No. 2.

The milling operation can be stopped at either cutter head or at the control panel by an Emergency Stop switch.

Machine Operating Specification.

The (DHVMM) cutting a circular opening in the (RPC) 2 dome structure permitting the removal of milled out dome segment 7. FIG. 2 and FIG. 3. The radial position setting is determined by the diameter of the (RPC) opening cut requirement. The vertical movement setting will determine the cutting depth. The cutters heads can rotate at various RPM settings. The two cutters move on a level circular orbit of about 190 degrees forward and backward path and are situated diametrically opposite from each other. This is necessary for power and signal cable protection by the cable tensioning reels 49 in FIG. 4. The forward/reverse feed speed can widely vary. The optimum cutting heads RPM, cutters insertion depth and advancing speed is set from the control panel. The cutters are removing about 87.5% materials on a forward travel and 12.5% on a return travel.

The (RPC) opening diameter is determined as follows:
Do=Dr+2Nl+12 inches
Where Do is the diameter of concrete opening.
Dr is the diameter of the largest reactor.
Nl is the length of the longest reactor nozzle.
12 inches is the required removal clearance.

Following completion of milling operation disconnect power supply, anchor bolts and remove (DHVMM) from top of (RPC).

Removal of the (RPC) 2 milled out segment 7 and steel lining 9 in FIG. 3.

A temporary load bearing 13 scaffolding 11 is installed inside the (PRC) 2 under the dome. Shore up steel lining 9 by screw jacks or steel columns 12 under the section to be removed. Weld columns 12 to steel lining 9.

Flame (Plasma) cut a 3 inches diameter opening in steel lining 9 at the exact center and install the lifting lug.

Flame (Plasma) cut at the required steel lining diameter to be removed. The steel lining opening diameter is determined as follows:

Ds=Do−6 inches

Where Ds is the diameter of steel lining opening.

Do is from [0014] above.

6 inches clearance required for welding preparation and welding.

Remove the (RPC) milled out dome segment 7 with the attached steel lining 9.

Remove temporary scaffolding 11 inside (RPC) to clear path for reactor removal.

Removal of Reactor Pressure Vessel. (RPV) 4. FIG. 1.

The removal and the replacement work procedure of the Reactor Pressure Vessel (RPV) will be performed simultaneously inside/outside the Reactor Primary Containment (RPC).

The Drywell Head and the (RPV) heads are removed and the (RPV) is de-fueled in accordance with the utility standard de-fueling procedure. All internals of (RPV) are removed. All piping, cabling, connections and vessel support squirt bolting will be disconnected, in reverse order of construction.

The (RPV) is decontaminated inside/outside at first by high pressure steam jet blasting followed by high pressure demineralized detergent hot water jet blasting. The collected water is pumped to the floor drain for Radioactive Waste Treatment. FIG. 1 show the stripped (RPV) 4 ready for standard rigging and lifting.

Remove existing (RPV).

Prepare new Replacement Reactor for installation.

According to precedent lifting record, the weight of a BWR/5 complete with fuel roads is 2,000 tons. Proper crane foundation shall be prepared and the new (RPV) lifted in place. Installed and tested in accordance with manufacture procedure.

Closure of (RPC) 2 FIG. 3.

Inside containment re-installs temporary scaffolding 11.

Remove 3 inches of concrete inside opening around reinforcing steel bars to facilitate welding preparation and welding.

Install and re-weld reinforcing steel bars and steel lining to existing steel.

All welding is to the strength of steel.

New replacement concrete is poured and allowed to cure.

What is claimed is:

1. Machinery system to cut out an approximately 20 feet diameter and approximately 36 inches thick steel-reinforced concrete circular segment at the top of a dome structure of a reactor primary containment, the system comprising, two diametrically opposite, movable cutting heads with adjustable cutting depth to gradually remove the concrete and steel around a perimeter at a certain radius of the circular segment of a planned dome opening, each cutting head equipped with multiple cutters with three axis directional movement and capable of rotating about its vertical axis at a set RPM, of vertically moving at a set rate and to a set cutting depth, and of traveling horizontally at a set feed speed in a circular arc forward from a starting point and reversing in an offset path from an end point back to the starting point in a repetitious manner.

2. The machinery system of claim 1, further comprising, a cross over structure for supporting the movable cutting heads, the structure capable of being temporarily anchored to the containment dome structure, a stationary circular inner and outer drive gear attached to the said cross over structure, and an inner and outer drive screw respectively engaged to the said drive gears and mounted on the movable cutting heads.

3. The machinery structure of claim 2, further comprising a lateral position setting and locking device mounted on a vertical support plate for reverse travel position of the cutting heads.

* * * * *